INVENTORS
EARL S. KLEINHANS
DAVID E. DUNLAP
BY
Charles W. Hamilton
AGENT

June 13, 1944.　　E. S. KLEINHANS ET AL　　2,351,215
RETRACTABLE LANDING GEAR
Filed Dec. 12, 1939　　2 Sheets-Sheet 2
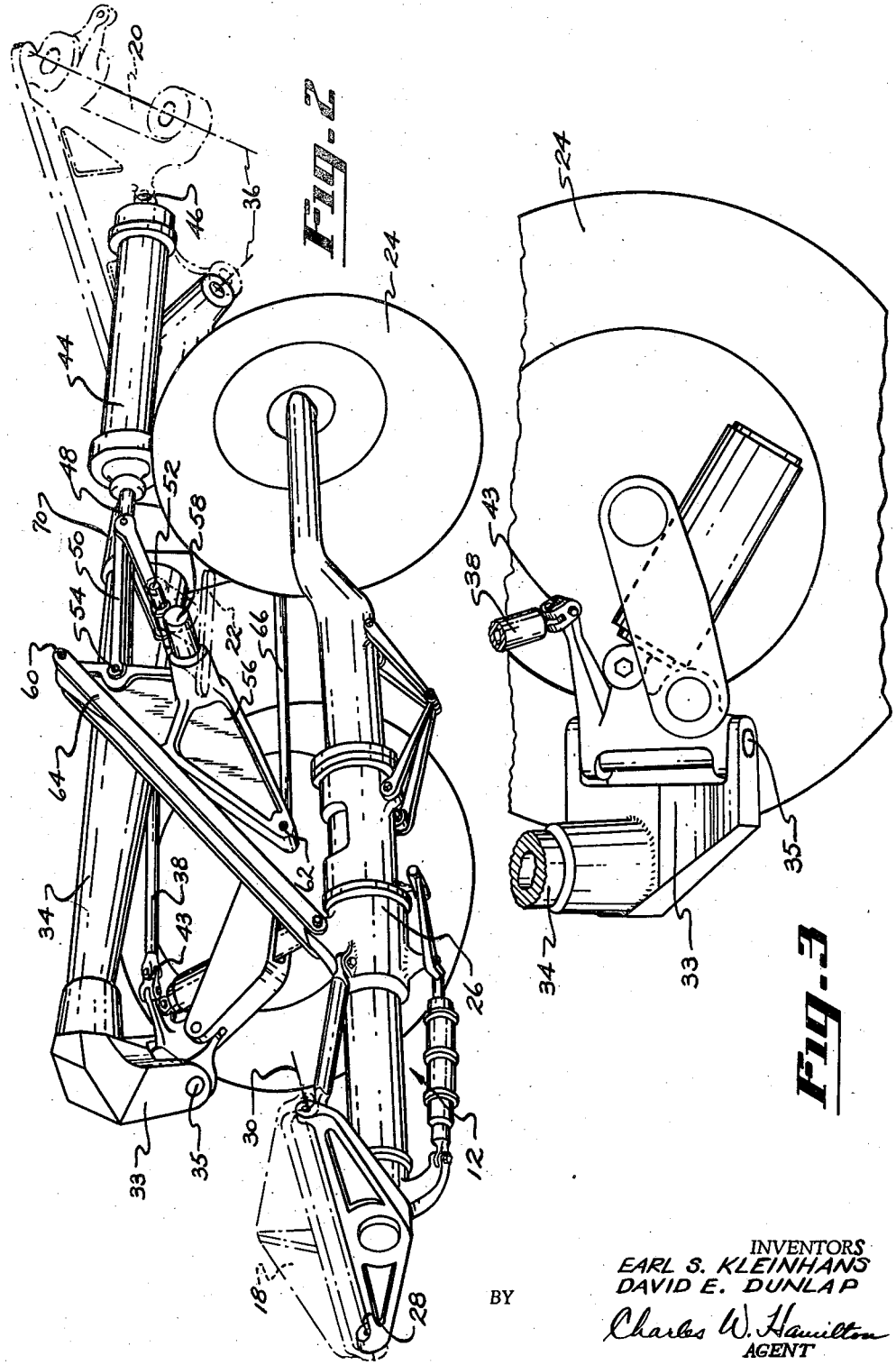
INVENTORS
EARL S. KLEINHANS
DAVID E. DUNLAP
BY Charles W. Hamilton
AGENT Patented June 13, 1944

2,351,215

UNITED STATES PATENT OFFICE 2,351,215

RETRACTABLE LANDING GEAR

Earl Schuyler Kleinhans and David E. Dunlap, Santa Monica, Calif., assignors to Douglas Aircraft Company, Incorporated, Santa Monica, Calif.

Application December 12, 1939, Serial No. 308,790

14 Claims. (Cl. 244—102)

Our invention relates to an improved retractable landing gear which is particularly well adapted for use in a high wing airplane of moderate size, or in any small airplane wherein it is desirable to attach the landing gear to the fuselage.

Many relatively small airplanes have been equipped with retractable landing gears in the past, but such gears are usually mounted in the wing for the purpose of obtaining sufficiently wide tread. Or, when mounted in the fuselage, they have necessarily been of such design that practically the entire diameter of the fuselage in the location of the gear is utilized. This is not desirable for the reason that it is a customary aim of designers to retain as much space for equipment as is compatible with the size of the fuselage.

It is an object of our invention to provide a retractable landing gear for mounting in a relatively small fuselage which, when retracted, utilizes less than half the vertical diameter of the fuselage in the location of the gear.

Another object of our invention is to provide a tricycle landing gear which is retracted and extended by a single hydraulic cylinder.

Other objects are: to provide a tricycle landing gear of wide tread which may be mounted to and retracted into a moderately sized fuselage; to provide a gear, the wheels of which remain in a plane substantially parallel with the direction of motion of the aircraft thereby creating relatively small drag; to provide a retractable landing gear adaptable for operation by a simple and weight saving hydraulic or electric installation; and to provide a landing gear design wherein the gear loads will extend the wheels, when retracted, without the use of a bungee or other spring devices.

Further objects are to provide a retractable landing gear, the design of which permits all retracting motion to be concentrated in a single walking beam allowing the use of one location in the aircraft for supporting all wheels; and to provide a tricycle landing gear design wherein the drag on the nose wheel when the aircraft is in forward motion will alleviate the drag on the main wheels when retracting the gear. Conversely, when extending the gear, the drag on the main wheels will overcome the drag on the nose wheel.

Other objects will become apparent in the following detail description and in the drawings in which:

Figure 2 is a perspective view of the airplane and landing gear of Figure 1 wherein the landing gear and retracting mechanism are shown in the retracted position, the left main landing gear struts and wheel having been omitted for clarity; and Figure 3 is a view in elevation of the knuckle and swivel connection between a main landing wheel and its respective struts.

Figure 1:
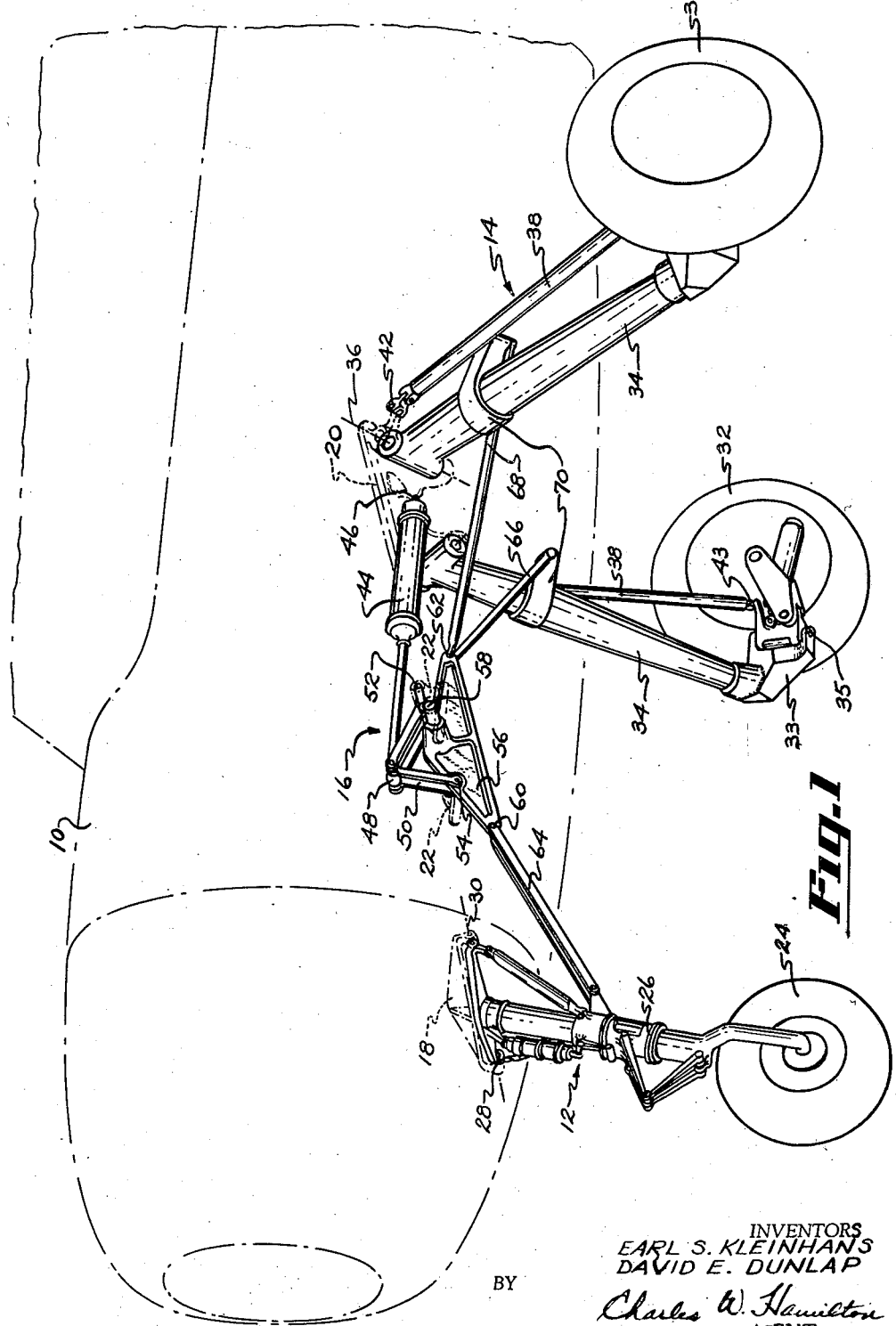
Figure 1 is a perspective view of the forward portion of an airplane fuselage having a retractable tricycle landing gear; the airplane and the attaching fittings for the landing gear and retracting mechanism being shown in phantom.

In the drawings, an airplane fuselage 10 supports a nose wheel assembly 12, a main landing wheel assembly 14 and a retracting mechanism 16. The nose wheel assembly is connected to the fuselage by fittings 18. The main wheel assembly is connected by fittings 20, and the retracting mechanism by fittings 20 and 22; all of which are shown by dotted lines in the drawings.

The nose wheel assembly 12 includes a wheel 24 and a supporting strut 26 which is pivotally mounted at 28 to the fuselage fitting 18 on a substantially horizontal axis 30. The strut is so mounted that it is adapted to swing rearward and upward about the axis 30 into a horizontal position within the fuselage as shown in Figure 2, upon operation of the retracting mechanism 16.

The main wheel assembly 14 includes a pair of wheels 32 each of which is mounted in a swivel connection 35 through a knuckle 33 to a main strut 34 hinged to the fuselage fitting 20 on a laterally inclined axis 36. These struts are so mounted that they are adapted to swing forward, upward and inward about the axes 36 into a substantially horizontal position, as shown in Figure 2, upon operation of the retracting mechanism 16.

An auxiliary strut 38 is also provided between each main landing wheel knuckle 33 and the fuselage fitting 20, this strut being connected to the fitting 20 and to the knuckle through universal joints at 42 and 43 respectively. The purpose of this auxiliary strut is to control the swivel connection 35 in the knuckle in order that the longitudinal plane of the wheel will remain substantially in the direction of motion of the airplane throughout retraction and extension movements. The angles in the knuckle and swivel connection are such that the wheel will nest in a fuselage recess in a position tangent to the fuselage when the gear is fully retracted but, when the gear reaches the fully extended position, the wheel will have moved to a substantially vertical position suitable for landing and taxiing.

The mechanism utilized for moving the landing gear to and from the retracted position includes a hydraulic cylinder 44 pivotally anchored at its one end 46 to the main landing gear to fuselage attaching fitting 20 and connected at its other end 48 to a linkage 50. One portion of this linkage is journaled at 52 to fuselage fitting 22, and the other portion is journaled at 54 to a walking beam or bellcrank 56. Bellcrank 56 is journaled for pivotal motion at another connecting point 58 on fitting 22. Two additional connecting points 60, 62 are provided on the bellcrank. One of these, 60, affords attachment for a brace rod 64 extending from nose wheel strut 26, and the other point, 62, affords attachment for a pair of brace rods 66, 68, one extending from a collar 70 on each main landing gear strut 34.

The operation of the retracting mechanism when pulling up the landing gear from the position shown in Figure 1 is as follows: the cylinder 44 is telescoped hydraulically which causes the linkage 50, by reason of its connection at 48 to the cylinder, to move in an arcuate path about the journaled pivot 52. This in turn rotates the walking beam or bellcrank 56 in a clockwise direction, about the axis 58, pulling upward and rearward on the nose wheel brace rod 64 and forward on the main landing gear brace rods 66, 68. As the nose wheel and main wheel brace rods are moved by the bellcrank, the nose wheel and main wheel struts are simultaneously pulled upward into a horizontal plane as shown in Figure 2. With the gear fully extended the brace rods 64, 66, and 68 are geometrically on dead center relative to the bellcrank and their respective wheel struts which feature serves as a lock to hold the gear fully down until the hydraulic cylinder begins to telescope.

In addition, it may readily be seen that with our retracting mechanism and wheel arrangement the drag on the nose wheel caused by the forward motion of the airplane through the air will assist the hydraulic cylinder when retracting the gear, inasmuch as the nose wheel moves rearward with the windstream. Furthermore, the greater weight of the main wheels will positively extend the gear and force the nose wheel forward against the wind stream, thereby precluding the use of balancing means such as a bungee or other spring devices.

While we have herein shown and described our invention in its present preferred embodiment, it will be apparent to those skilled in the art that various modifications may be made therein without departing from the spirit and scope of the subjoined claims.

We claim:

1. A retractable landing gear for aircraft including a pair of main landing wheels and a balancing wheel, a pair of wheel-carrying struts for said main landing wheels, said struts being hinged on inclined transverse axes; an additional wheel-carrying strut for said balancing wheel, said strut being hinged on a horizontal transverse axis, said struts being dimensioned and having hinge axis locations to centrally interleave the balancing wheel between the main wheels when the three wheels are retracted; power means for retracting and extending said wheels longitudinally toward and away from each other respectively; and link means connecting said power means with said struts; whereby simultaneous movement of said main wheel and balancing wheel struts is obtained upon operation of said power means.

2. A retractable landing gear for aircraft including a pair of main landing wheels and a nose wheel; a pair of wheel-carrying struts for said main landing wheels, said struts being hinged on laterally inclined axes; means forming swivel connections between said main wheels and said wheel struts, so constructed that the longitudinal plane of the wheels remains substantially in the direction of motion of the aircraft throughout the retraction of the struts; an additional wheel carrying strut for said nose wheel, said strut being hinged on a substantially horizontal axis; a walking beam connecting said main wheel struts and said nose wheel strut for simultaneous retraction; and power means connected to said walking beam to effect such retraction.

3. A retractable landing gear for aircraft including a pair of main landing wheels and a nose wheel; a pair of wheel-carrying struts for said main landing wheels, said struts being hinged on laterally inclined axes; means forming swivel connections between said main wheels and said main wheel struts, so constructed that the longitudinal plane of the wheel remains substantially in the direction of motion of the aircraft throughout the movement of the struts; an additional wheel carrying strut for said nose wheel, said strut being hinged on a substantially horizontal axis; power means for retracting and extending said wheels, link means attached to each wheel strut; and walking beam means connecting said link means and said power means, the said walking beam, link and power means being so organized and arranged that, when retracting, the nose wheel will swing rearward and upward and the main wheels will swing forward, upward and inward.

4. An aircraft fuselage; means forming recesses in said fuselage to receive a landing gear when retracted; said landing gear including a pair of main landing wheels and a balancing wheel; wheel carrying struts for said main landing wheels, said struts being hinged on inclined axes; means forming swivel connections between said main wheels and said main wheel struts, said connections being so constructed that the longitudinal plane of the wheels remains substantially in the direction of motion of the aircraft throughout the movement of the struts; an additional wheel carrying strut for said balancing wheel, said strut being hinged on a substantially horizontal axis; walking beam means and linkage connecting said main wheel struts and said balancing wheel strut for simultaneous retraction; and power means connected to said walking beam and linkage means to effect such retraction.

5. In aircraft having a body, a retractable landing gear including a nose wheel and a pair of main wheels disposed in tricycle fashion with the first said wheel located forward of and between said pair of wheels, a forwardly and downwardly extending strut pivotally connected to said body for carrying said nose wheel, a downwardly and outwardly extending strut pivotally connected to each side of said body for carrying one of said pair of wheels, a power device connected to said nose wheel strut and adapted to rotate said strut about its pivotal connection to a substantially horizontal attitude within said body, and means connecting each of said main wheel struts to said power device whereby said last named struts are likewise rotated about their pivotal connections upon actuation of said power device, the length of said struts and their direction of rotation being such that when said nose wheel strut is in a substantially horizontal position the wheel thereof lies between and rearward of the pair of main wheels.

6. In aircraft having a body, a retractable landing gear including a nose wheel and a pair of main wheels disposed in tricycle fashion with the first said wheel located forward of and between said pair of wheels, a forwardly and downwardly extending strut pivotally connected to said body for carrying said nose wheel, a downwardly and outwardly extending strut pivotally connected to each side of said body for carrying one of said pair of wheels, a jointed member connecting each of said main wheels to its respective strut through which each wheel may swing with respect thereto, an auxiliary strut positioned adjacent to each main wheel strut and pivotally connected to said aircraft body and to the wheel carrying portion of said jointed member for controlling the swinging of the wheel with respect to its main strut, and a power device connected to said nose wheel and main wheel struts for simultaneously rotating them past each other about their body connecting pivots.

7. In aircraft having a body, a retractable landing gear including a nose wheel and a pair of main wheels disposed in tricycle fashion with the first said wheel located forward of and between said pair of wheels, a forwardly and downwardly extending strut pivotally connected to said body for carrying said nose wheel, a downwardly and outwardly extending strut pivotally connected to each side of said body for carrying one of said pair of wheels, a walking beam pivotally mounted in said body, link means connecting said nose wheel strut to a portion of said walking beam, a pair of diverging link means connecting said main landing wheel struts to another portion of said walking beam, a power device, and a linkage arrangement connecting said power device to a third portion of said walking beam whereby, upon actuation of said power device said walking beam is pivoted on its body mounting to rotate said wheel carrying struts about their body pivots to retract and extend the landing wheels.

8. In aircraft having a body, a retractable landing gear including a nose wheel and a pair of main landing wheels disposed in tricycle fashion, a forwardly and downwardly extending strut pivotally connected to said body for carrying said nose wheel, a downwardly and outwardly extending strut pivotally connected to each side of said body for carrying one of said pair of wheels, a jointed member connecting each of said main wheels to its respective strut through which each wheel may swing with respect thereto, an auxiliary strut positioned adjacent to each main wheel strut and pivotally connected to said aircraft body and to the wheel carrying portion of said jointed member for controlling the swinging of the wheel with respect to its main strut, link means connecting said nose wheel strut to a portion of said walking beam, a pair of diverging link means connecting said main landing wheel struts to another portion of said walking beam, a power device, and a linkage arrangement connecting said power device to a third portion of said walking beam whereby, upon actuation of said power device said walking beam is pivoted on its body mounting to rotate said wheel carrying struts about their body pivots to retract and extend the landing wheels.

9. In aircraft having a body, a retractable landing gear including a nose wheel and a pair of main landing wheels disposed in tricycle fashion, a strut connecting each of said wheels to said aircraft body, hinge means between said nose wheel strut and said body about which said nose wheel and strut are adapted to be swung retractively rearwardly and upwardly in a planar arc, additional hinge means between each of said main landing wheel struts and said body about which each main landing wheel and strut are adapted to be swung retractively forwardly and upwardly in a planar arc angularly disposed to the other main landing wheel and strut arc and to said nose wheel arc of travel said hinge means and struts being arranged to retractively dispose said three wheels adjacent to each other in transversely interleaved relation at a substantially common level, means interconnecting all of said wheel struts, and a single power means operating upon said interconnecting means to simultaneously swing all of said wheels through their arcs of travel.

10. In aircraft having a body, a retractable landing gear including a nose wheel and a pair of main landing wheels disposed in tricycle fashion, a strut connecting each of said wheels to said aircraft body, hinge means between said nose wheel strut and said body about which said nose wheel and strut are adapted to be swung rearwardly in a planar arc, additional hinge means between each of said main landing wheel struts and said body about which each main landing wheel and strut are adapted to be swung forwardly in a planar arc angularly disposed to the other main landing wheel and strut arc and to said nose wheel arc of travel, means associated with each main landing wheel and strut for changing the position of the wheel with respect to the strut as they travel through their arc, means interconnecting all of said wheel struts, and a single power means operating upon said interconnecting means to simultaneously swing all of said wheels through their arcs of travel.

11. In an aircraft having a body, a retractable landing gear including a nose wheel and a pair of main wheels disposed in tricycle fashion with the first said wheel located forward of and between said main wheels, a strut pivoted to said body for carrying said nose wheel, a strut pivoted to each side of said body for carrying one of said pair of wheels, a walking beam and linkage interconnecting said struts intermediate the ends thereof for swinging said nose wheel strut upwardly and rearwardly and for swinging said main wheel struts forwardly and upwardly into transverse alinement with said nose wheel strut in retraction, and power means connected to said walking beam to move said nose wheel and said main wheels past each other in retraction.

12. In an aircraft having a body, a retractable landing gear including a nose wheel and a pair of main wheels, means connected to said body for carrying said nose wheel, means connected to each side of said body at a station longitudinally removed from that of said first mentioned connection for carrying one of said pair of main wheels, and means for simultaneously retracting said wheel carrying means, said nose wheel carrying means and said two main wheel carrying means moving longitudinally toward each other into transverse juxtaposition in said body.

13. In an aircraft having a body, a retractable landing gear including a nose wheel and a pair of main wheels, means connected to said body for carrying said nose wheel, said means being adapted to be swung rearwardly in a sector, means connected to each side of said body at a station longitudinally removed from that of said first mentioned connection for carrying one wheel of said pair, each of said last named means being adapted to be swung forwardly in a sector, the upper portions of said sectors being in transverse alinement and at a common level, and means for swinging said three wheel carrying means over said sectors into juxtaposition in said body.

14. An aircraft fuselage; means forming a recess in said fuselage to receive a landing gear when retracted; a landing gear including a pair of main landing wheel structures and a nose wheel structure, said structures being pivoted to the fuselage with the nose wheel structure pivot forward of the pivots of the main wheel structures and the pivot locations and structure dimensions being such as to dispose the nose wheel between and forward of the main wheels when said landing gear is extended and between and aft of said main wheels when said landing gear is retracted; and a single power means adapted to simultaneously swing said nose wheel structure rearward and upward about its pivot and said main wheel structures forward, upward and inward about their pivots into retracted position in said fuselage recess.

EARL SCHUYLER KLEINHANS.
DAVID E. DUNLAP.

CERTIFICATE OF CORRECTION.

Patent No. 2,351,215. June 13, 1944.

EARL SCHUYLER KLEINHANS, ET AL.

It is hereby certified that error appears in the printed specification of the above numbered patent requiring correction as follows: Page 2, second column, line 44, claim 4, for "said" read --a--; and that the said Letters Patent should be read with this correction therein that the same may conform to the record of the case in the Patent Office.

Signed and sealed this 29th day of August, A. D. 1944.

Leslie Frazer (Seal)            Acting Commissioner of Patents.